(12) United States Patent
Kanie

(10) Patent No.: US 7,320,571 B2
(45) Date of Patent: Jan. 22, 2008

(54) DEVICE FOR MOUNTING A COMPONENT SUCH AS A PIPE ON A STUD

(75) Inventor: Hideki Kanie, Nissin (JP)

(73) Assignee: Newfrey LLC, Newark, DE (US)

( * ) Notice: Subject to any disclaimer, the term of this patent is extended or adjusted under 35 U.S.C. 154(b) by 490 days.

(21) Appl. No.: 10/663,653

(22) Filed: Sep. 17, 2003

(65) Prior Publication Data

US 2004/0140406 A1   Jul. 22, 2004

Related U.S. Application Data

(63) Continuation-in-part of application No. 10/624,646, filed on Jul. 23, 2003, now Pat. No. 7,008,160.

(30) Foreign Application Priority Data

Aug. 1, 2002 (JP) ............................... 2002-224620
Sep. 19, 2002 (JP) ............................... 2002-272668

(51) Int. Cl.
  *F16B 37/08* (2006.01)
  *F16B 37/16* (2006.01)
(52) U.S. Cl. ...................................... 411/433; 411/437
(58) Field of Classification Search ................ 411/433, 411/437, 525, 526, 527
  See application file for complete search history.

(56) References Cited

U.S. PATENT DOCUMENTS 4,828,444 A * 5/1989 Oshida ........................ 411/437
4,934,889 A * 6/1990 Kurosaki ..................... 411/433
4,999,019 A * 3/1991 Kraus .......................... 411/512
5,423,647 A * 6/1995 Suzuki ......................... 411/433
5,598,994 A * 2/1997 Olewinski et al. ............ 248/73
5,816,762 A * 10/1998 Miura et al. ................ 411/433
6,070,836 A * 6/2000 Battie et al. ................ 248/68.1
6,155,762 A * 12/2000 Courtin ....................... 411/512
6,185,792 B1 2/2001 Nelson et al. ................. 24/16
6,240,602 B1 * 6/2001 Geiger ..................... 24/16 PB
6,585,196 B2 * 7/2003 Nakanishi ................... 248/68.1
7,008,160 B2 * 3/2006 Kanie ......................... 411/433

FOREIGN PATENT DOCUMENTS

EP     0 751 597    1/1997
EP     0 759 523    2/1997
JP     9-159061     6/1997

* cited by examiner

*Primary Examiner*—Katherine Mitchell
*Assistant Examiner*—David C Reese
(74) *Attorney, Agent, or Firm*—Miles & Stockbridge P.C.

(57) ABSTRACT

A device for mounting a component, such as a pipe, on a threaded stud comprises a main body section with a bore for inserting a stud and a component mounting section. The device includes only a single pawl that extends from a first inner wall of the bore in a direction perpendicular to the axis of the bore. The pawl has a flexible thin section connected to the inner wall and a thick section extending from the thin section. The pawl can be bent in opposite directions at the thin section. A pair of thread engaging sections for engaging threads of the stud are formed at an end of the thick section. A pair of grooves for engaging threads are formed adjacent to respective engaging sections.

12 Claims, 5 Drawing Sheets

A ≠ B

A = B

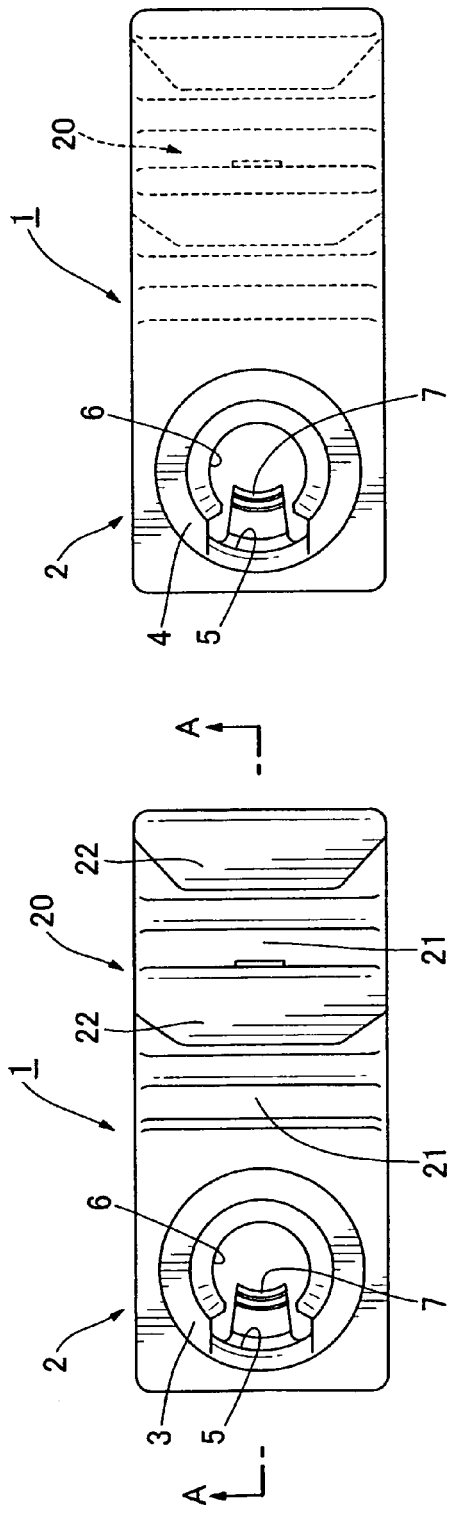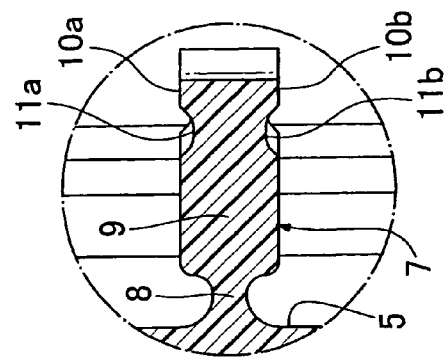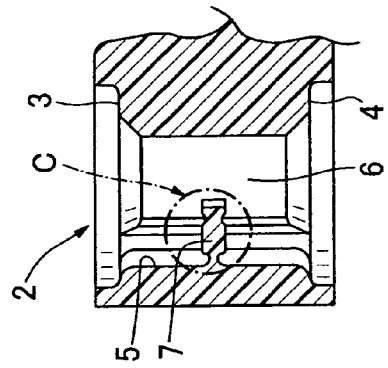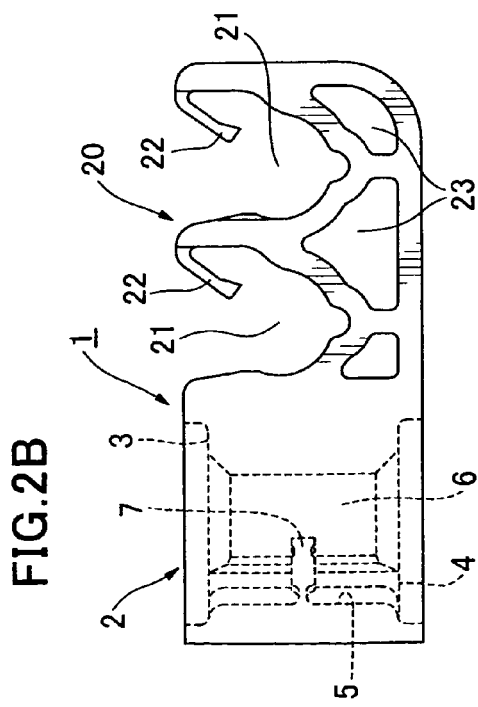

US 7,320,571 B2

DEVICE FOR MOUNTING A COMPONENT SUCH AS A PIPE ON A STUD

CROSS-REFERENCE TO RELATED APPLICATIONS

This application is a continuation-in-part of application Ser. No. 10/624,646 filed Jul. 23, 2003, now U.S. Pat. No. 7,008,160 issued Mar. 7, 2006, and claims the benefit of Japanese Patent Application No. 2002-272668 filed Sep. 19, 2002, and Japanese Patent Application No. 2002-224620 filed Aug. 1, 2002, both incorporated herein by reference.

BACKGROUND OF THE INVENTION

This invention relates to a device for mounting components, such as pipes, on a stud.

Prior devices for attaching a component to a threaded stud, welded to the body of an automobile, for example, have a bore into which the stud is inserted to engage pawls that fasten the device to the stud. In one such device, the orientation of the pawls in the bore is fixed, which restricts insertion of the stud into the bore to a single direction.

Japanese Unexamined Patent Application Publication No. 9-159061 discloses a device for attaching a component to a stud, in which the stud can be inserted into a bore from either end. Flexible fingers having thread-engaging protrusions bend from hinge sections when a stud is inserted into the bore. However the fingers are bent nearly 90° from the hinge sections, and as a result a large insertion force is required to insert the stud. Also, because the retention force is limited by the thin sections, the attachment of the device to the stud is weak.

The invention of the above-cited copending application permits the easy insertion of a stud into the bore of an attachment device from either direction and is capable of a secure attachment. One embodiment disclosed in the above-identified copending application, has a pair of pawls, but as mentioned in that application, the number of pawls is not limited to two.

FIGS. 1A and 1B show a two-pawl embodiment of the copending application. FIG. 1A shows a situation in which a stud 30 is inserted into the bore of the attachment device with some lateral deviation between the axis of the stud and the axis of the bore, while FIG. 1B shows a situation in which there is little or no deviation. In FIG. 1A, the two pawls 7 are oriented asymmetrically with respect to the stud, so that the extent of engagement of the pawls with the threads 31 of the stud (A in one case and B in the other case) is unequal, and slippage between the stud and the pawls is more likely to occur than in the situation shown in FIG. 1B, where the pawls 7 are equally engaged with the threads 31 of the stud (i.e., A=B). Indeed, in FIG. 1A the pawl 7 at the left of the figure has become almost ineffective in restraining the slippage of the attachment device along the stud 30.

BRIEF DESCRIPTION OF THE INVENTION

The present invention makes use of only a single pawl in a manner that minimizes slippage.

An object of the present invention is to provide a device for mounting a component on a stud, in which the stud can be inserted into a bore of the device from either end, with a small insertion force, and in which a single pawl provides attachment of the device to the stud that is strong and reliable.

Briefly stated, an embodiment of a device according to the present invention employs a single pawl having a thick section extending from a thin section forming a hinge that connects the pawl to a wall of the bore. Thread engaging sections for engaging the threads of the stud are formed at an end of the thick section of the pawl. One of the engaging sections engages threads of the stud by insertion in a space between crests of the threads of the stud when the stud is inserted in the bore from one direction, and the other engaging section similarly engages threads of the stud when the stud is inserted in the bore from the opposite direction. Grooves are formed on the pawl near respective engaging sections for accommodating one of the thread crests. One of the grooves is used when the stud is inserted into the bore from one direction, and the other groove is used when the stud is inserted into the bore from the opposite direction.

The invention will be further described in conjunction with the accompanying drawings, which illustrate a preferred (best mode) embodiment of the invention, and wherein:

FIG. 2A is a plan view of a single-pawl device according to the invention;

FIG. 2B is a side view of the single-pawl device;

FIG. 2C is a plan view of the single-pawl device as seen from a direction opposite to that of FIG. 2A;

FIG. 2D is a fragmentary sectional view taken along line A-A in FIG. 2A;

FIG. 2E is an enlarged sectional view of a portion designated in FIG. 2D by a circle C;

DETAILED DESCRIPTION OF THE INVENTION

Figure 1A:
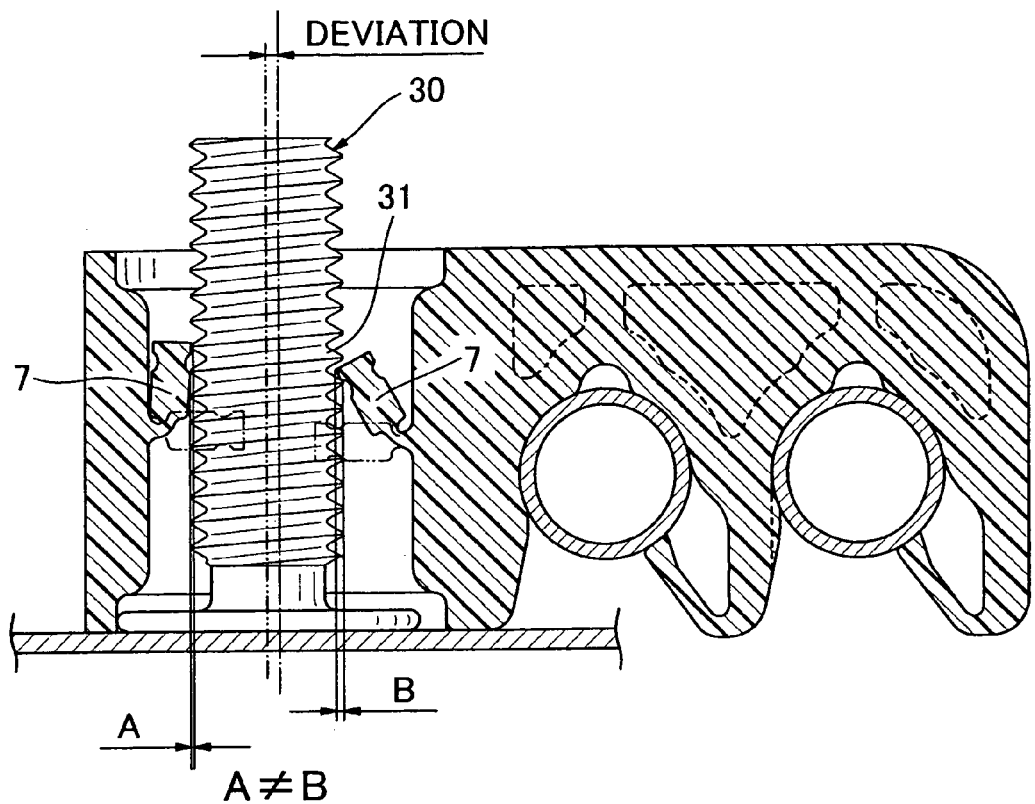
FIGS. 1A and 1B are sectional views of a two-pawl device.
Figure 1B:
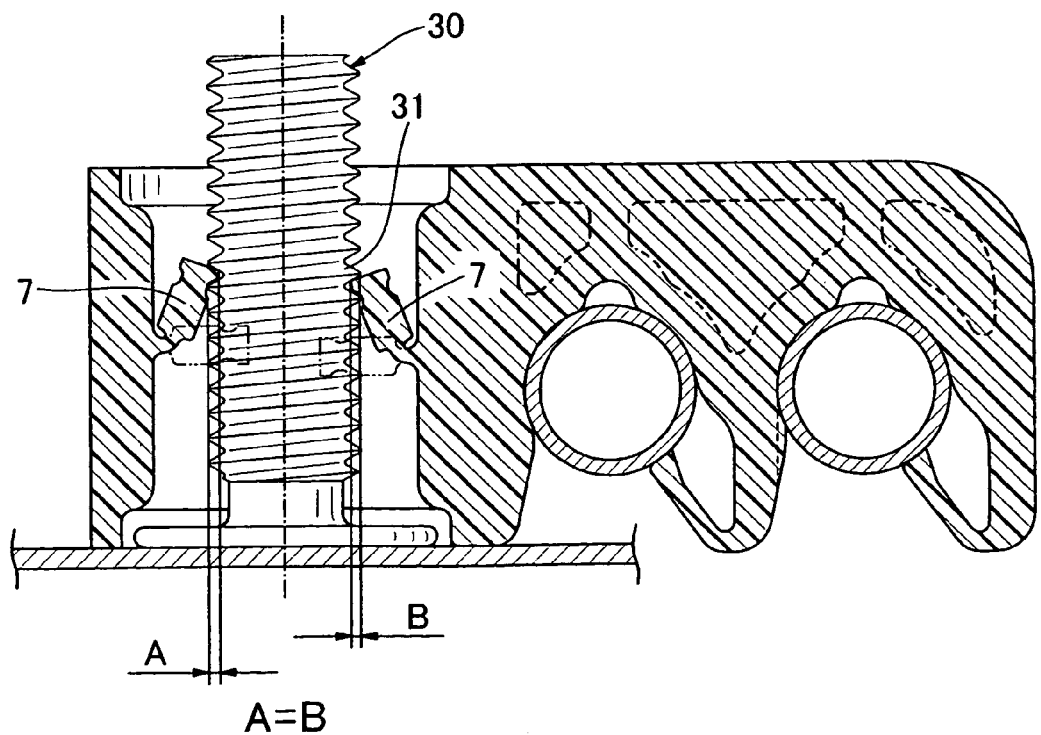

An embodiment of the invention shown in FIGS. 2A-2E, 3, 5 and 6 of the drawings comprises a device 1 having a main body section 2 and a component mounting section 20 for attaching a component such as a pipe or dash silencer to a threaded stud 30. In the form shown, the upper and lower surfaces of the main body section 2 are nearly flat, and dish shaped recesses 3 and 4 are formed in the upper and lower surfaces to accommodate a widened base of the stud. A bore is formed in the main body section 2. The stud 30 is inserted into the bore from either end to attach the device 1 to the stud.

A single pawl 7 extends from an inner wall 5 of the bore of the main body section 2 substantially perpendicular to the axis of the bore, as shown in FIGS. 2D and 2E.

As shown in FIG. 2E, adjacent to the inner wall 5 of the bore, the pawl 7 has a flexible thin section 8 forming a hinge that permits the pawl 7 to bend from the thin section 8 in either axial direction of the bore. The thin section 8 supports a thick section 9, which, in the form shown, is nearly flat on its side surfaces facing the ends of the bore. The thick section 9 is more rigid and more difficult to bend than the thin section 8.

Thread engaging sections 10*a,b* are formed at the end of the thick section 9 to engage threads 31 on the stud 30. Engaging section 10*a* is formed at one side of the pawl 7, and engaging section 10*b* is formed at the opposite side. As shown in FIGS. 2A and 2C, the tips of the engaging sections 10*a,b* of pawl 7 are arcuate so as to conform to the curvature of the threads 31.

Figure 3:
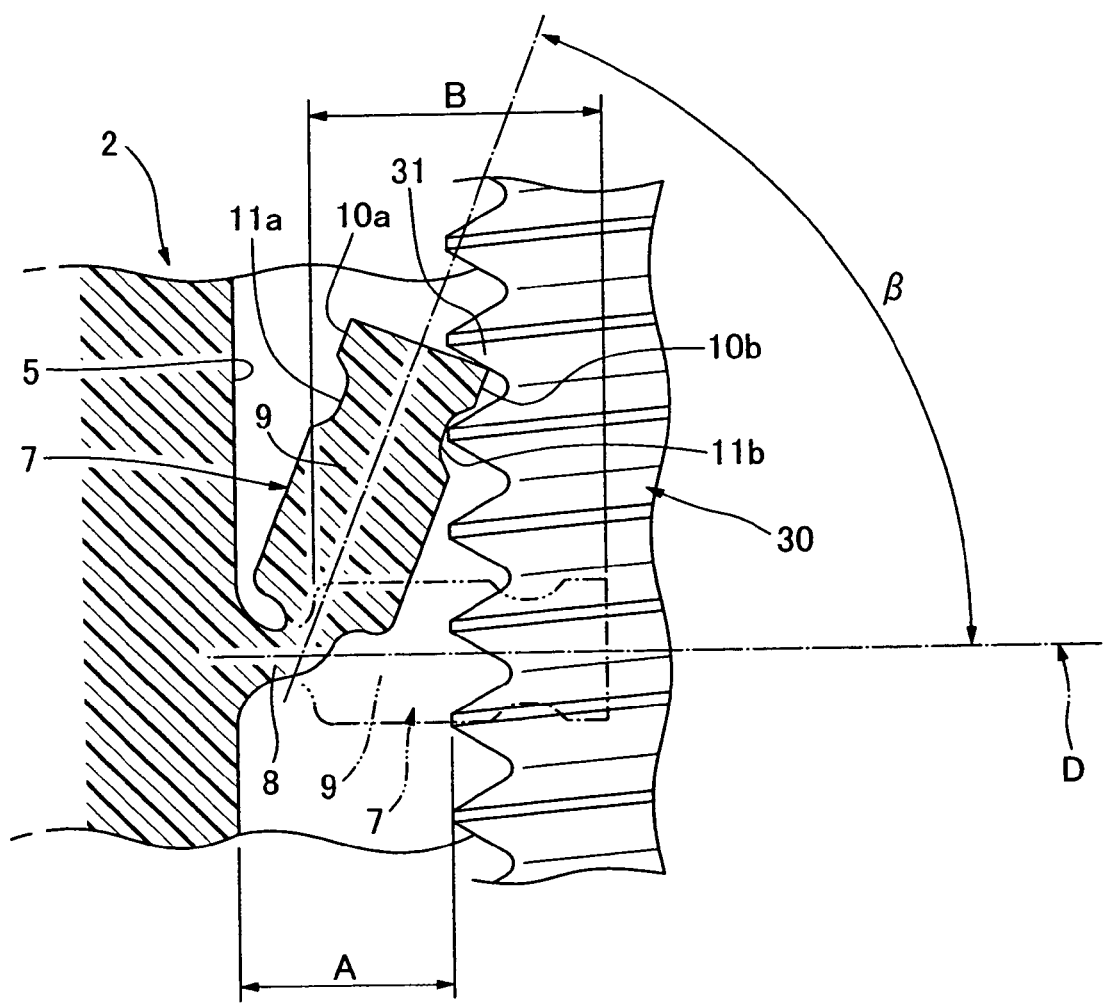
FIG. 3 is an enlarged fragmentary sectional view showing engagement of the pawl with threads of the stud.

As shown in FIG. 2E, a threading groove 11*a* is formed near engaging section 10*a*, and a threading groove 11*b* is formed near engaging section 10*b*. As shown in FIG. 3, when an engaging section (e.g., 10*b*) engages threads of the stud 30, it enters a space between successive crests of the threads and one of the crests is received by one of the grooves (e.g., 11*b*). The threading grooves 11*a,b* keep crests of the threads from coming into contact with the sides of thick section 9 and allow the engaging sections to approach the root of the threads. The threading grooves 11*a,b* are arcuate so as to conform to the curvature of the threads 31.

As shown in FIGS. 2A, 2C, 2D, there is an inner wall 6 of the bore that extends around the circumference of the bore except for the location of an inner wall 5 to which the pawl 7 is attached by the thin section 8. The radius of inner wall 6 is smaller than the radius of inner wall 5. The inner diameter of inner wall 6 is slightly larger than the outer diameter of the stud 30. Because there is only a single pawl 7, the inner wall 6 can, to a major extent, closely surround the stud. Because there is only a slight space between the inner wall 6 and the stud 30, there can be only a little lateral movement of the stud 30 in the bore, as set forth later.

The component mounting section 20 is used to mount a component such as a pipe. In this example, recesses 21 (see FIG. 2B) are formed in the component mounting section 20 to accommodate the pipes. Resilient retainers 22 formed in the component mounting section 20 hold the components in the mounting section. Hollow sections 23 may be formed below the recesses 21 to reduce the weight of the device.

FIG. 3 shows the pawl 7 when the device 1 has been mounted on a stud 30. Before the device is mounted on the stud, the centerline D of the pawl 7 extends in a direction substantially perpendicular to the axis of the bore. See the dotted line position of pawl 7. When the stud 30 is inserted into the bore from one end, the pawl 7 is pressed against threads 31 of the stud 30 and bends toward the opposite end of the bore. When the device 1 has been mounted on the stud, the centerline of the pawl 7 extends in a direction that forms an angle β substantially less than 90° with respect to the initial direction of the centerline D of the pawl 7 before mounting.

In the form shown in FIG. 3, the length of the thick section 9 of the pawl 7 is B. Also, the distance between the inner wall 5 and the stud 30 is A. The length B of the thick section 9 of the pawl 7 is a constant substantially greater than A. If the difference between B and A were small, the device 1 would tend to come off the stud 30.

Figure 4:
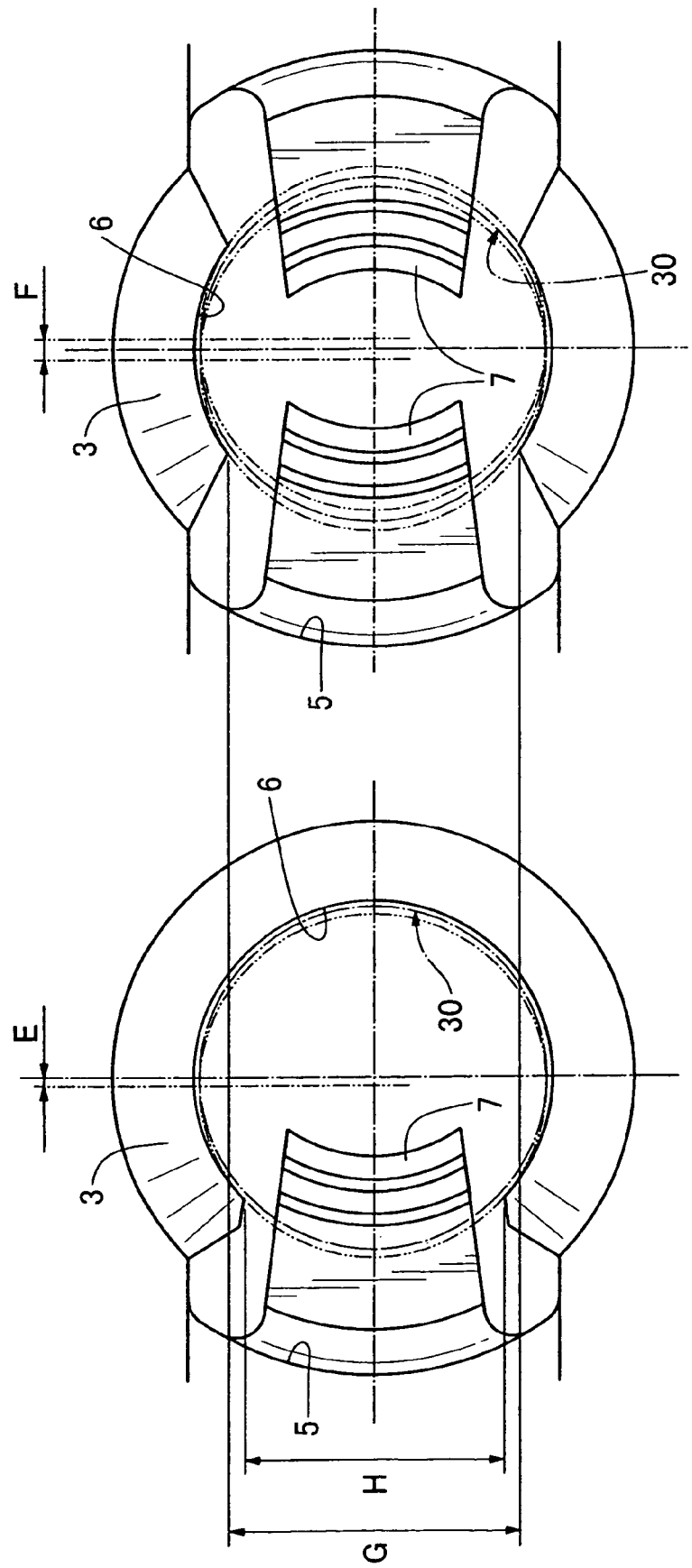
FIGS. 4A and 4B are diagrammatic plan views illustrating the extent to which lateral movement of a stud in a bore can occur in a single-pawl device (FIG. 4A) and in a two-pawl device (FIG. 4B)

FIGS. 4A and 4B are simplified diagrams showing, comparatively, the extent to which lateral movement of the stud in the bore can occur in single-pawl and two-pawl devices. FIG. 4A shows the extent E of lateral movement along a direction between pawl 7 and an opposite wall 6 (referred to as a first direction) when there is only a single pawl 7, as in an embodiment of the present invention. FIG. 4B shows the extent F of lateral movement along the same first direction when there are two pawls 7, as shown in an embodiment in the aforementioned copending application.

In FIG. 4B, the inner wall 6 is discontinuous on opposite sides of the bore where the pawls 7 are mounted. As a result, there is a possibility of significant lateral movement of stud 30 in the first direction between the pawls, with consequences discussed earlier in connection with FIG. 1A. In FIG. 4A the inner wall 6 is continuous except where the single pawl 7 is mounted, and the pawl presses the stud 30 against the inner wall 6 at the side of the bore opposite to the pawl 7. As a result, there can be very little movement of the stud in the first direction between the pawl and the inner wall 6.

As is apparent in FIG. 4B, sections of the inner wall 6 restrict lateral movement of the stud 30 in the bore in a second direction orthogonal to the first direction. In the single-pawl embodiment of FIG. 4A, such movement of the stud in the bore is similarly restricted.

In the example shown in FIG. 4A, the difference between dimension G (width of wall 5 at the base of pawl 7) and dimension H (distance between the ends of inner wall 6) is made as small as possible. As a result, the circumference of the stud is closely surrounded by the inner wall 6 except where the pawl is mounted, and the inner wall 6 extends circumferentially around the stud to an extent that is sufficient to restrict lateral movement of the stud in the bore in the first direction.

Figure 5:
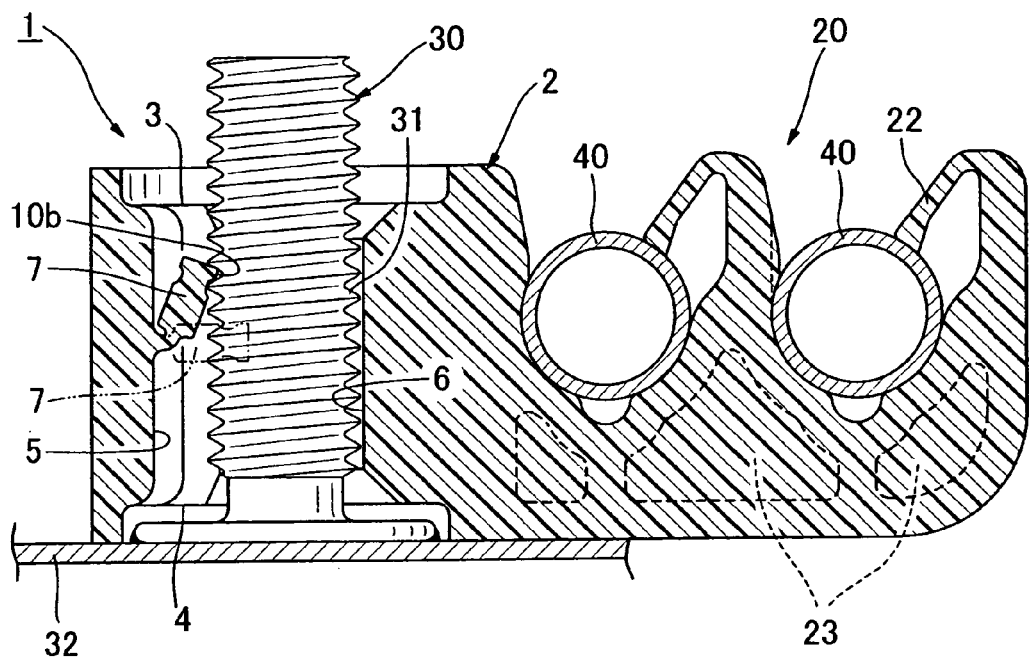
FIG. 5 is a sectional view showing a device of the invention with a stud inserted into a bore of the device from one end.

FIG. 5 is a cross-sectional view showing the device 1 in an embodiment of the present invention mounted on a stud 30 in one direction. The position of the pawl 7 before mounting is indicated by the dotted lines, and the position of the pawl 7 after mounting is indicated by the solid lines. When the stud 30 is inserted into the bore in the device 1, the pawl 7 is bent at the thin section and moves along the threads 31 of the stud 30. At the mounting position, the engaging section 10*b* on the pawl 7 and the threading groove 11*b* engage the threads 31 on the stud 30, and the device 1 is secured to the stud 30.

Components 40 such as pipes can be attached to the component mounting section 20 before the device 1 is mounted on the stud 30, or after the device 1 has been mounted on the stud 30.

Figure 6:
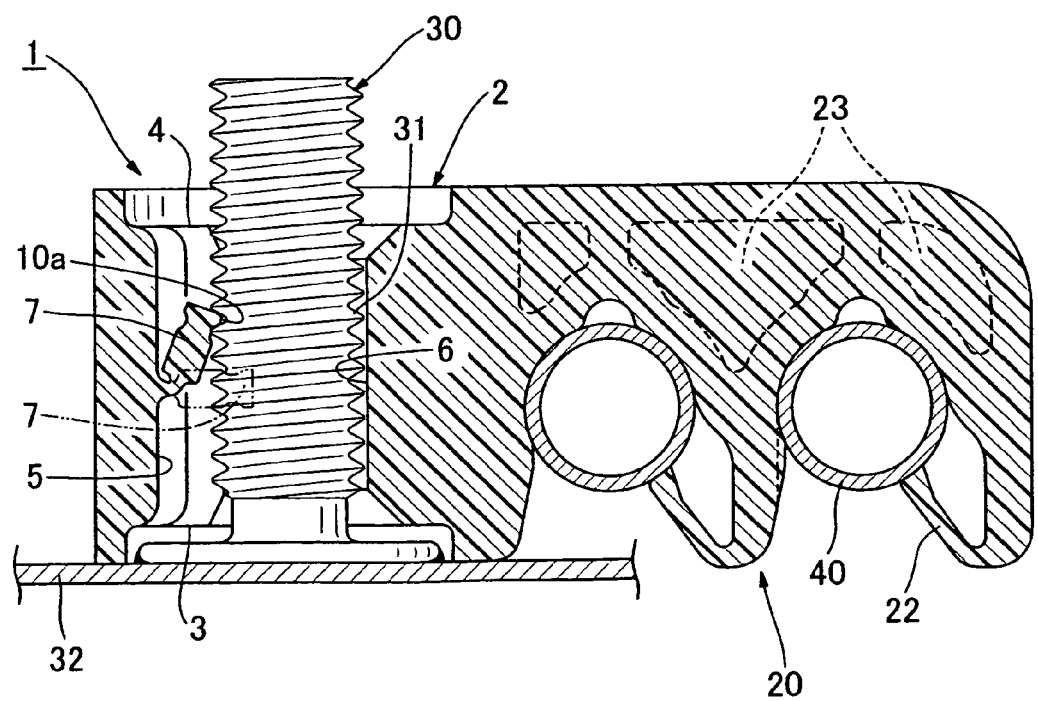
FIG. 6 is a sectional view showing a device of the invention with a stud inserted into the bore from the opposite end.

FIG. 6 is a cross-sectional view of the device 1 mounted on a stud 30 in the opposite direction. When the stud 30 is inserted into the bore in the device 1, the pawl 7 is bent at the thin section in the direction opposite to that shown in FIG. 5 and moves along the threads 31 of the stud 30. At the mounting position, the engaging section 10*a* on the pawl 7 and the threading groove 11*a* engage threads 31 on the stud 30, and the device 1 is secured to the stud 30.

Again, components 40 such as pipes can be attached to the component mounting section 20 before the device 1 is mounted on the stud 30, or after the device 1 has been mounted on the stud 30.

The device in this embodiment of the present invention can be mounted on a stud from either direction and has the same mounting properties in both directions. Because the device has only a single pawl, a stud can be inserted into a bore of the device with little force, and when the stud is inserted, the pawl achieves an effective angle in the bore that does not vary. The arcuate threading grooves on the pawl assist the arcuate engaging sections of the pawl in engaging threads of a stud securely. By virtue of the fact that an inner wall of the bore closely surrounds the stud except for a region where the pawl is mounted, the amount of slippage of the stud in the bore is minimized, and the device of the invention can be reliably attached to a stud with a stable retention force.

While a preferred embodiment of the invention has been shown and described, it will be apparent that changes can be made without departing from the principles and spirit of the invention, the scope of which is defined in the accompanying claims. For example, while a preferred embodiment of the invention has an inner wall 6 that is continuous, the inner wall 6 might be somewhat discontinuous so long as it provides the lateral movement restricting functions of the continuous inner wall 6 shown in FIG. 4A.

What is claimed is:

1. A device to be attached to a threaded stud, comprising a body having a bore for insertion of a stud, wherein the device has only a single pawl, and, in the absence of a stud in the bore, the pawl extends from an inner wall of the bore in a direction substantially perpendicular to a longitudinal axis of the bore, wherein the pawl has a flexible thin section connected to the inner wall and a thick section extending from the thin section, wherein the pawl can be bent in opposite directions at the thin section for mounting the device on a stud from two directions, wherein the pawl has only a single pair of thread engaging sections thereon, said pair being formed at opposite sides of the thick section at a tip end of the thick section, one or another of the engaging sections being disposed for entering a space between crests of threads of a stud depending on a direction of insertion of the stud in the bore, wherein the pawl has only a single pair of grooves thereon, said grooves being formed adjacent to corresponding engaging sections of the pawl at the opposite sides of the thick section, each groove being disposed for receiving a crest of a thread adjacent to the space between crests, and wherein the opposite sides of the thick section of the pawl extending continuously from the grooves to the thin section are devoid of thread engaging sections and grooves corresponding to thread engaging sections.

2. The device according to claim 1, wherein a tip of each engaging section is arcuate in a plane perpendicular to the longitudinal axis of the bore so as to conform to curvature of the threads.

3. The device according to claim 2, wherein each groove is arcuate in a plane perpendicular to the longitudinal axis of the bore so as to conform to curvature of the threads.

4. A device according to claim 1, wherein the body includes a component mounting section for holding a component.

5. A device to be attached to a threaded stud, comprising a body having a bore for insertion of a stud, wherein the device has only a single pawl, and, in absence of a stud in the bore, the pawl extends from an inner wall of the bore in a direction substantially perpendicular to a longitudinal axis of the bore, wherein the pawl has a flexible thin section connected to the inner wall and a thick section extending from the thin section, wherein the pawl can be bent in opposite directions at the thin section for mounting the device on a stud from two directions, wherein the pawl has only a single pair of thread engaging sections thereon, said engaging sections being formed at an end of the thick section, one or another of the engaging sections being disposed for entering a space between crests of threads of a stud depending on a direction of insertion of the stud in the bore, wherein a length of the thick section of the pawl is substantially greater than a distance between the inner wall and a stud fully inserted in the bore, and wherein after full insertion of a stud in the bore, a centerline of the pawl forms an angle substantially less than 90° from the centerline of the pawl before insertion of a stud.

6. A device to be attached to a threaded stud, comprising a body having a bore for insertion of a stud, and having only a single pawl in the bore, wherein the pawl is connected by a hinge to a first inner wall of the bore, wherein the pawl has a centerline extending in a first direction substantially perpendicular to a longitudinal axis of the bore before insertion of a stud in the bore and forming an angle of substantially less than 90° with respect to the first direction after full insertion of the stud in the bore, and wherein the pawl has only a single thread engaging section at one side of the pawl, that enters a space between successive crests of threads of a stud, said thread engaging section being located at a tip of the pawl, and the pawl has only a single groove at said one side of the pawl, that receives one of the crests of the thread, said groove being adjacent to the thread engaging section, wherein the pawl has a length extending continuously along said one side from the groove to the hinge that is devoid of thread engaging sections and thread crest receiving grooves, and wherein a second inner wall of the bore is constructed to minimize lateral movement of the stud in the first direction, and in a direction orthogonal to the first direction.

7. A device according to claim 6, wherein the second inner wall of the bore is dimensioned to closely surround a major portion of a circumference of the stud.

8. A device according to claim 6, wherein the engaging section and the groove are formed on a section of the pawl substantially thicker than a section of the pawl forming the hinge.

9. A device according to claim 8, wherein there is only a single section and only a single groove at each of opposite sides of the thicker section of the pawl, whereby an engaging section and a groove can engage threads of the stud irrespective of a direction of insertion of a stud into the bore.

10. A device according to claim 9, wherein tips of the engaging sections and the grooves are arcuate in a plane perpendicular to the longitudinal axis of the bore to conform to curvature of the threads of the stud.

11. A device according to claim 6, wherein a stud is disposed in the bore.

12. A device according to claim 6, wherein the body includes a component mounting section for holding a component.

* * * * *